(12) United States Patent
Gilbert

(10) Patent No.: US 7,260,188 B2
(45) Date of Patent: Aug. 21, 2007

(54) SYSTEM AND METHOD FOR SCANNING VOICE MAIL MESSAGES

(75) Inventor: Quenton Lanier Gilbert, Atlanta, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 0 days.

(21) Appl. No.: 10/891,689

(22) Filed: Jul. 15, 2004

(65) Prior Publication Data

US 2006/0013366 A1 Jan. 19, 2006

(51) Int. Cl.
*H04M 1/64* (2006.01)
(52) U.S. Cl. .................................... 379/88.21; 709/206
(58) Field of Classification Search .................. 379/68, 379/88.11, 88.16, 88.22, 88.04, 88.17, 88.21; 709/206
See application file for complete search history.

(56) References Cited

U.S. PATENT DOCUMENTS

| 6,442,243 | B1 | 8/2002 | Valco | |
|---|---|---|---|---|
| 6,683,940 | B2 * | 1/2004 | Contractor | 379/88.17 |
| 6,868,142 | B2 * | 3/2005 | Gupta et al. | 379/88.04 |
| 6,885,732 | B2 * | 4/2005 | Fellenstein et al. | 379/68 |
| 2006/0002523 | A1 * | 1/2006 | Bettis et al. | 379/88.22 |

* cited by examiner

*Primary Examiner*—Gerald Gauthier
(74) *Attorney, Agent, or Firm*—Gardner Groff Greenwald & Villanueva, P.C.

(57) ABSTRACT

A voice mail system that provides a message scan mode that plays back only brief portions of each message, i.e., message snippets, saved in the voice mailbox queue. If the user takes no action while the message snippet is being played back, or within a short grace period after that, the system automatically skips to the next message in the queue and plays a snippet of that message without requiring any interaction on the part of the user. The user has the option of making a selection that causes the entire message to be played.

24 Claims, 3 Drawing Sheets

SYSTEM AND METHOD FOR SCANNING VOICE MAIL MESSAGES

BACKGROUND OF THE INVENTION

1. Field of Invention

The present invention relates to telecommunications and, more particularly, to a voice mail system of a telecommunications network that provides a scan mode that plays snippets of voice mail messages rather than the entire messages.

2. Description of Related Art

Current voice mail systems play back the entire voice mail message to the user and then provide the user with several options to allow the user to set the disposition of the message, such as, for example, save the message, delete the message, move the message to a mailbox folder, etc. The user is also able to set the status of the message once the entire message has been played back to the user. For example, once the message has been played back, the user can set the status of the message as new, saved, previously played, etc.

One major disadvantage of current voice mail systems is that they are very menu driven and require a lot of user interaction. In current voice mail systems, when the user accesses the user's voice mailbox, each message is played in its entirety to the user unless the user takes some action while a message is being played, such as save, delete, move to a folder, etc. At the end of each message, the user hears a system audio prompt that informs the user of which keys to press on the telephone keypad in order to cause various actions to occur. For example, the prompt may state something to the effect of "Press one to save the message", "Press 2 to delete the message", "Press 3 to replay the message", "press 9 to change user options", etc. When the user selects one of the available options, the system will cause the corresponding action to occur. If the user does not select one of the available options, the audio prompts will be replayed until the user selects one of the options or hangs up the telephone.

The level of user interaction required by such menu driven systems is often inconvenient to the user and, in certain situations, dangerous. For example, often times cellular telephone users check their voice mail while driving. To interact with the system, the user typically looks at the telephone and tries to depress a certain key or combinations of keys on the telephone keypad that correspond to a particular option. Not only is it difficult for the user to make the appropriate selection while driving, the user is distracted from driving, which can lead to accidents. In addition, because it is often difficult to make the desired selection while driving, the user may make the wrong selection, which can lead to other problems, such as a message being inadvertently deleted.

Attempts have been made to improve voice mail systems by reducing the level of user interaction required. For example, Valco et al., U.S. Pat. No. 6,442,243, discloses a voice mail system that attempts to streamline the interaction between the user and the menu driven voice mail system. In this system, if the user does not select a menu option within a certain amount of time after a message is played back, the system automatically retrieves the next message in the queue and plays it back to the user. In order to reduce the amount of user interaction required, the messages automatically begin playing when the user accesses the user's mailbox without the need for the user to enter a password. Also, messages remain classified as new or saved after they have been played unless the user explicitly saves it or erases it. Valco et al. states that because of these features, the voice mail system requires less user interaction than other voice mail systems and thus facilitates "hands-free" operation.

Although the system disclosed in Valco et al. requires less user interaction than other prior art voice mail systems system, the Valco et al. system still requires user interaction to skip to the next message in the queue if the user doesn't want to listen to the entire message. Either the entire message is played without requiring any interaction on the part of the user, or the user must interact to skip to the next message, to save the current message or to delete the current message. Accordingly, a need yet exists for a voice mail system that further decreases the amount of user interaction required, and that also provides the user with all of the many useful options and features of known voice mail systems.

SUMMARY OF THE INVENTION

The present invention is a voice mail system that provides a message scan mode that plays back only brief portions of each message, i.e., message snippets, saved in the voice mailbox queue. If the user takes no action while the message snippet is being played back, or within a short grace period after that, then the system automatically skips to the next message and plays a snippet of the next message without requiring any interaction on the part of the user. Each message portion is played back until all of the message portions have been played.

In accordance with an embodiment, the voice mail system automatically enters the scan mode when the user accesses the user's voice mailbox. A user password may or may not be required to access a voice mailbox. During play back of the message snippets, preferably the system allows the user to take action. For example, in accordance with an embodiment, the user can make selections while a message snippet is being played back, such as, for example, "Save", "Delete", "Hear All", etc. If the user does take action while the snippet is being played back, or within a grace period after that, preferably the status associated with the message is automatically changed accordingly.

If the user takes no action while a message snippet if being played back, the entire message associated with the snippet preferably remains in its position in the mailbox queue and the message status remains unchanged. At the end of the snippet play back, preferably a default action occurs, such as, for example, an autosave action, an autodelete action, a maintain-current-status action, etc. The default actions can be set globally for the entire system or they may be personal and set by each individual user. The length of the snippets may also be set globally for the entire system or it may be personal and set by each individual user.

In accordance with an embodiment, the user is provided with the ability to exit the scan mode and enter a play mode. The play mode may be the same or similar to the play modes used in current voice mail systems. For example, in current voice mail systems, each message is played back in its entirety and the user is prompted with a series of menu options immediately following playback of each message. In accordance with this embodiment, if the user is listening to a snippet in the scan mode and decides that they want to hear the entire message associated with the snippet, the user makes a selection (e.g., presses a key or series of keys on the telephone keypad) that causes the system to exit the scan mode and enter the play mode. In the play mode, the user interacts with the system in the normal manner. Once the user has processed the message in question (by pressing a key or keys to skip, save, etc.), the user exits the play mode and re-enters the scan mode at the point where the scan mode was exited. Preferably, the user is provided with the ability to toggle between the scan and play mode.

By providing the scan mode, the users are able to obtain at least some information about the message, such as who the sender is and the topic, without having to interact with the system. The user has the ability to cause the entire message associated with the snippet to be played if so desired, and to take actions of the type normally provided by current voice mail systems. These and other features and advantages of the present invention will become apparent from the following description, drawings and claims.

DETAILED DESCRIPTION OF THE EXEMPLARY EMBODIMENTS

Figure 1:
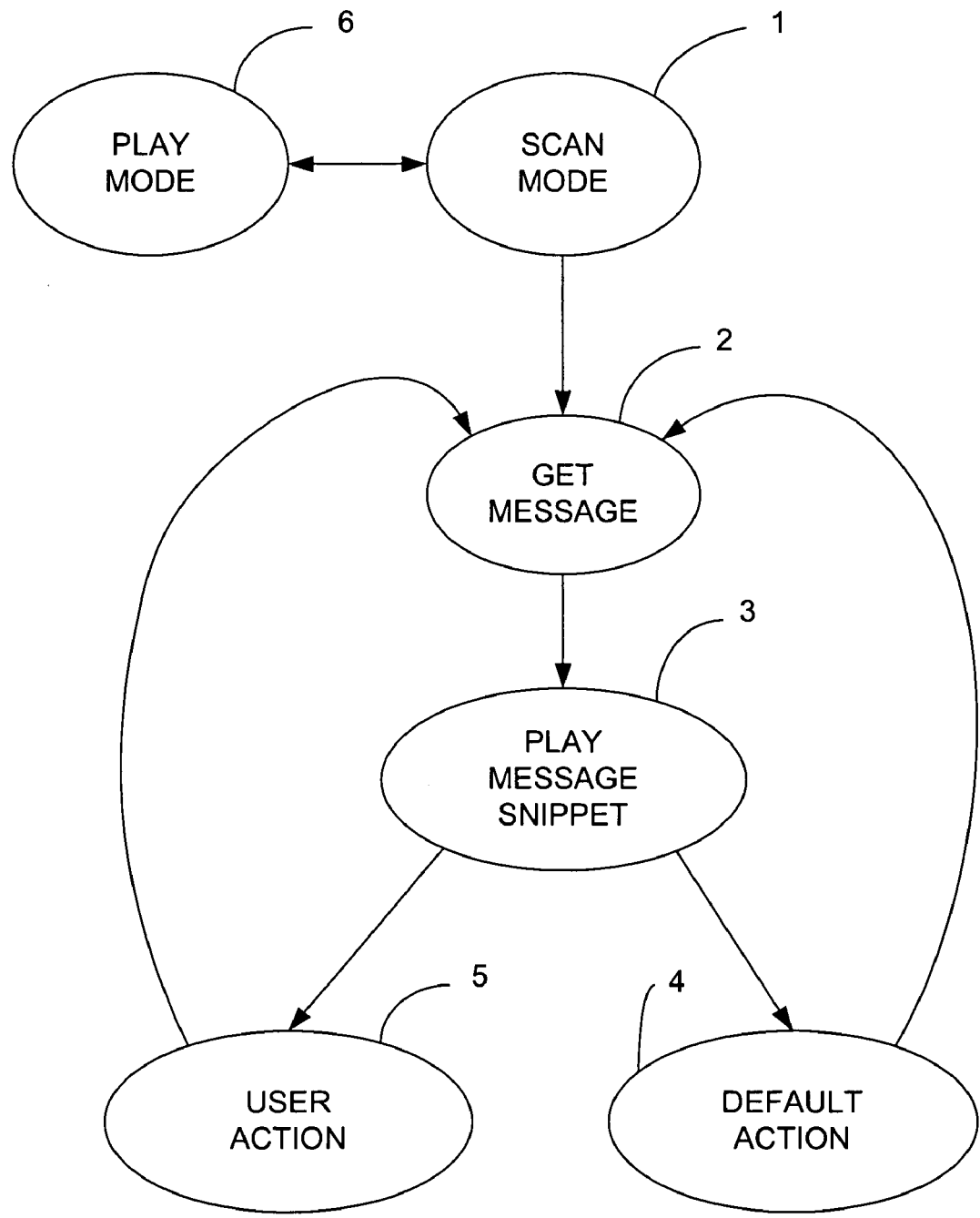
FIG. 1 illustrates a state diagram that demonstrates the flow of control of the voice mail system of the invention in accordance with an embodiment.

FIG. 1 illustrates a state diagram of the voice mail system of the invention in accordance with an embodiment. In accordance with this embodiment, the voice mail system automatically enters the scan mode state 1 when the user accesses the user's voice mailbox. When the user enters the scan mode state 1, the system enters a "Get Message" state 2, during which the message snippets are played back to the user. Preferably, the message snippets are played back in a first-in-first-out (FIFO) sequence. When the "Get Message" state 2 is entered, a snippet of the first message stored in the queue is retrieved from the queue and the "Play Snippet" state 3 is entered. In the "Play Snippet" state, the first Y seconds of the message is played, where Y is some length of time greater than 0 seconds, such as 5 seconds, for example.

From the "Play Snippet" state 3, the system preferably can enter either a "Default Action" state 4 or a "User Action" state 5. If no selection is made by the user while in the "Play Snippet" state 3, the system automatically enters the "Default Action" state 4 when the snippet being played back ends. In the "Default Action" state, a default action occurs, such as, for example, an autosave action, an autodelete action, a maintain-current-status action, a change-current-status action, etc. The default actions can be set globally for the entire system or they may be personal and set by each individual user. After the default action has occurred, the system returns to the "Get Message" state 2 and a snippet of the next message in the queue is played back to the user.

If the user makes a selection while in the "Play Snippet" state 3, the system enters a "User Action" state 5. In state 5, the user can make selections such as, for example, "Save", "Delete", "Hear All", etc. If the user makes a "Save" selection, the message associated with the snippet remains saved in the queue. If the user makes a "Delete" selection, the message associated with the snippet is deleted. If the user makes a "Hear All" selection, the entire message associated with the snippet is played back to the user. After the action is taken by the user, the system returns to the "Get Message" state 2 and the next message saved in the queue is retrieved from the queue.

In accordance with an embodiment, the system provides a play mode that plays the entirety of the messages stored in the queue followed by prompts that describe user options, such as "Save", "Delete", "Send", "Change User Options", etc. The structure of the play mode may be, for example, the same as or similar to that described in Valco et al., U.S. Pat. No. 6,442,243, which is incorporated herein by reference in its entirety. The invention is not limited with respect to the structure of the play mode. For example, Valco et al. is directed to a play mode having a non-hierarchical structure as opposed to a hierarchical structure. Valco et al. describes a "traditional" hierarchical play mode structure in the Background Of The Invention in that patent. The scan mode structure of the invention is suitable for use with either type of play mode interface structure, regardless of the hierarchical or non-hierarchical nature of the play mode interface structure.

In accordance with this embodiment, the user is provided with the ability to exit the Scan Mode state 1 and enter the Play Mode state 6. The play mode may be the same or similar to the play modes used in current voice mail systems. In accordance with this embodiment, if the user is listening to a snippet in the scan mode and desires to hear the entire message associated with the snippet, the user makes a selection (e.g., presses a key or series of keys on the telephone keypad) that causes the system to exit the Scan Mode state 1 and enter the Play Mode state 6. In the play mode, the user interacts with the system in the normal manner. Once the user has processed the message in question (by pressing a key or keys to skip, save, etc.), the user exits the play mode and re-enters the scan mode at the point where the scan mode was exited. Preferably, the user is provided with the ability to toggle between the scan mode and play mode.

Figure 2:
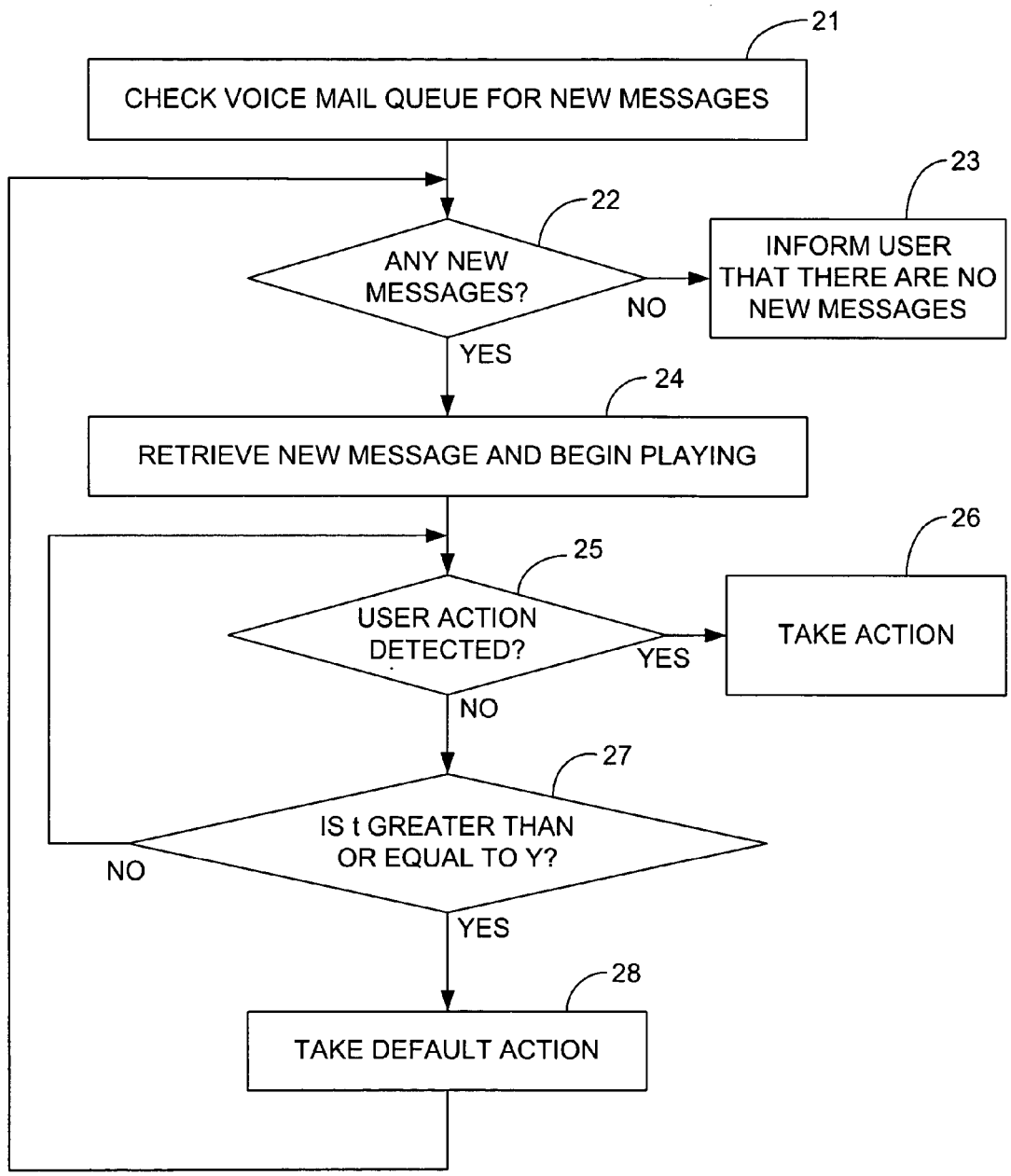
FIG. 2 illustrates a flow chart of the method of the invention in accordance with the embodiment of FIG. 1.

FIG. 2 illustrates a flow chart of the method of the invention in accordance with an embodiment. The method of the invention may be implemented as one or more software modules executed by a computer comprising the voice mail system. Voice mail systems typically are implemented on servers interfaced to a network by telephone user interface (TUI) and programmed with audio play and audio recording software.

Figure 3:
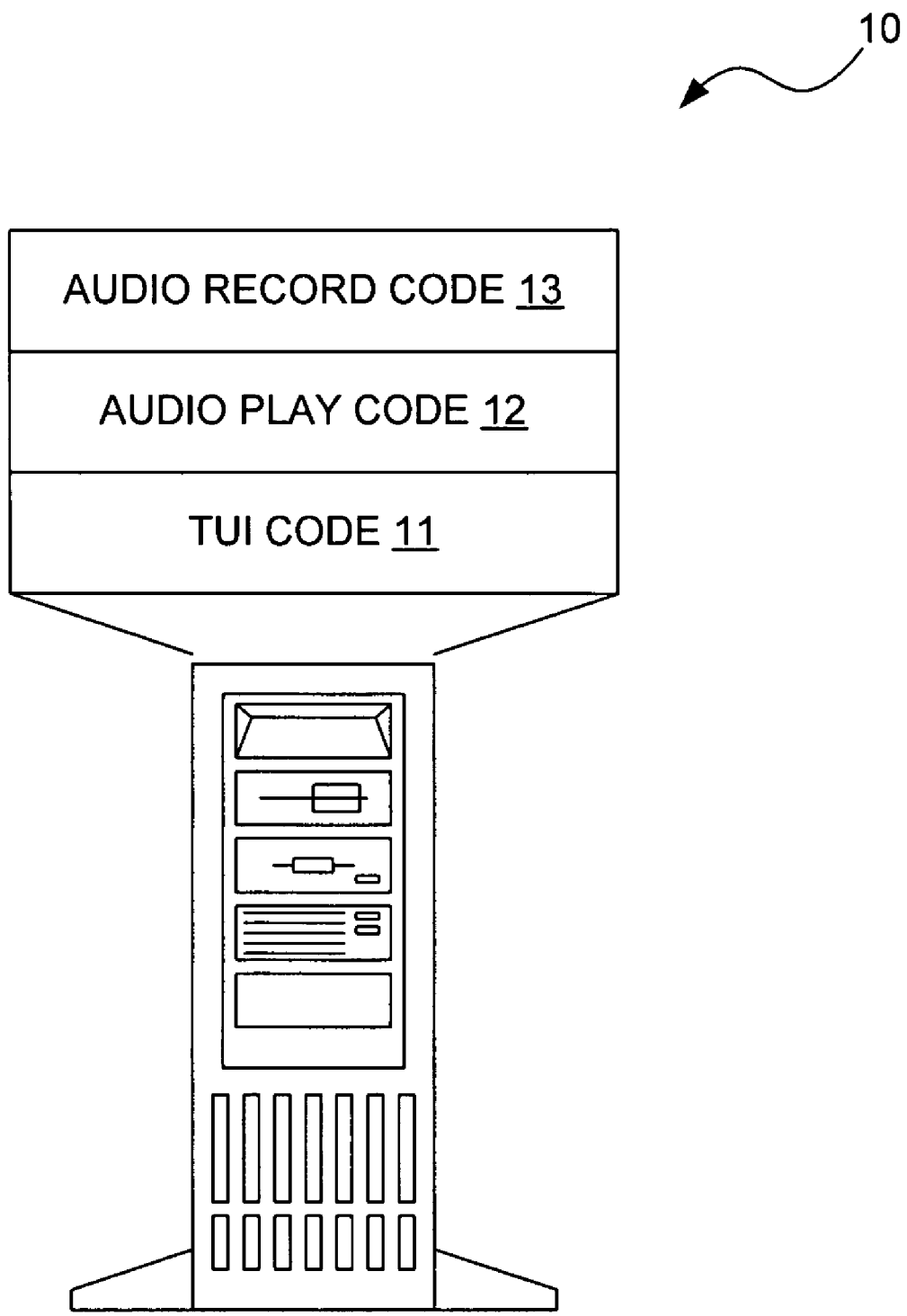
FIG. 3 illustrates the voice mail system of the invention in accordance with an embodiment.

FIG. 3 illustrates the voice mail system of the invention in accordance with an embodiment. The voice mail system 10 comprises a computer, which preferably is a server, programmed to perform the functions discussed above with reference to FIG. 1. Specifically, the server is programmed with code 11 for performing the TUI functions, code 12 for performing the audio play functions and code 13 for performing the audio record functions.

The server may be accessed via any type of communications network including, for example, a switched network, a cellular network, a wireless network, or any combination thereof. Typically, the voice mail server will be located at a central office (CO) of a switched network or a mobile switching center (MSC) of a cellular network. However, the invention is not limited with respect to the location of the voice mail system or with respect to the type of network in which the voice mail system is used. The invention also is not limited with respect to the type of device that the user uses to access the voice mail system. Suitable devices include, for example, land line telephones, cellular telephones, and wireless devices that have Voice Over Internet Protocol (VoIP) capability, including wireless telephones, personal digital assistants (PDAs) and computers.

With reference again to the flow chart shown in FIG. 2, when the user accesses the user's voice mailbox, the system preferably automatically defaults to the scan mode. Once in the scan mode, the system checks the queue associated with the user for messages, as indicated by block 21. A determination is made as to whether any new messages are contained in the queue, as indicated by block 22. If not, the system informs the user that there are no new messages, as indicated by block 23. If the queue contains new messages, the system retrieves the first message and begins playing back the message to the user, as indicated by block 24. While the snippet is being played back, the system determines whether a user action has been detected, as indicated by block 25. If the system detects a user action, the system performs the task associated with the detected action, as indicated by block 26. If no user action is detected, the system determines whether the value of a variable t, which corresponds to the amount of time that the message has played so far, is equal to or greater than Y seconds, as indicated by block 27. As stated above, the value of Y can be set globally for all users or it can be a personal option set by each individual user.

If the value of t is not equal to or greater than Y, the message continues to play and the system returns to block 25. If the system determines that the value of t is equal to or greater than Y, the system takes whatever default action has been set, as indicated by block 28. After the system takes the default action, the system returns to block 22 and determines whether any new messages remain in the queue. The process then continues on in the manner described above with respect to blocks 23-28.

It should be noted that although the present invention has been described with reference to particular embodiments, the present invention is not limited to the embodiments described herein. Modifications can be made to the embodiments described herein and all such modifications are within the scope of the invention. For example, many variations can be made to the method described above with reference to FIG. 2 without deviating from the invention. Those skilled in the art will understand the manner in which various programs can be written to accomplish the functions described above with reference to the state diagram shown in FIG. 1. All such variations are within the scope of the invention.

What is claimed is:

1. A voice mail system for access by a user, the system providing a voice mailbox for the user and being configured so that each time when the user accesses the user's voice mailbox, the system initially and automatically plays snippets of voice mail messages to the user without first requiring the user to make a menu selection to choose to hear snippets instead of the entire messages and without requiring any further input from the user, each snippet corresponding to a portion of a corresponding voice mail message and being shorter in duration than the entire message.

2. The voice mail system of claim 1, wherein if the system detects that the user has made an action selection while one of the voice mail snippets is being played to the user, the voice mail system performs an action associated with the action selection.

3. The voice mail system of claim 1, wherein the voice mail system plays a snippet of a voice mail message by playing the voice mail message for a pre-selected time period that ends before the voice mail message has been played in its entirety.

4. A voice mail system for access by a user and being configured to interface to a communications network, the voice mail system providing a voice mailbox for the user and comprising:

recording logic configured to record audio messages;
play logic configured to play audio messages; and
telephone user interface (TUI) logic configured to cause audio messages to be played by the play logic to the user of the voice mail system and to perform actions in response to selections made by the user, wherein when the user accesses the user voice mailbox the TUI logic automatically executes a scan mode routine that causes the play logic to automatically play respective snippets of respective messages stored in a voice mailbox associated with the user when the user accesses the user's voice mailbox without first requiring the user to make a menu selection to choose to hear snippets instead of the entire messages and without requiring any further input from the user, each snippet being a portion of the respective audio message, each portion being shorter in duration than the entire message.

5. The voice mail system of claim 4, wherein when the scan routine is executed, each message is played for a particular period of time, Y.

6. The voice mail system of claim 4, wherein after a message has been played for a period of time Y, the scan mode routine causes a scan default action to be performed.

7. The voice mail system of claim 6, wherein the default scan action is an autosave action, an autodelete action, a status change action, a prevent status change action or a combination thereof.

8. The voice mail system of claim 6, wherein the default scan action is set by the user.

9. The voice mail system of claim 6, wherein the default scan action is set globally for all users of the voice mail system.

10. The voice mail system of claim 4, wherein if a user makes a selection while a portion of a message is being played, the TUI logic causes an action associated with the user's selection to occur.

11. The voice mail system of claim 10, wherein the user's selection is a save selection, and wherein if the TUI logic detects that the save selection has been made, the TUI logic causes the message being played to be saved.

12. The voice mail system of claim 10, wherein the user's selection is a delete selection, and wherein if the TUI logic detects that the delete selection has been made, the TUI logic causes the message being played to be deleted.

13. The voice mail system of claim 10, wherein the user's selection is a "hear all" selection, and wherein if the TUI logic detects that the "hear all" selection has been made, the TUI logic causes the entire message to be played.

14. The voice mail system of claim 4, wherein if the user selects a play mode selection, the TUI logic exits the scan mode routine and executes a play mode routine, and wherein during the play mode routine, the TUI logic plays an entirety of each message stored in the user's voice mailbox.

15. The voice mail system of claim 14, wherein selections are available to the user that cause the TUI logic to toggle between execution of the play mode routine and execution of the scan mode routine.

16. The voice mail system of claim 15, wherein if the user makes a selection during execution of the scan mode routine that causes the TUI logic to execute the play mode routine, the current message is played in its entirety.

17. The voice mail system of claim 14, wherein if the user makes a selection during execution of the play mode routine that causes the TUI logic to execute the scan mode routine, then the TUI logic skips from playing a current message to playing a subsequent message in the voice mailbox, and wherein the TUI logic causes a portion of said subsequent message to be played, the portion of the subsequent message being shorter in duration than the entirety of the subsequent message.

18. The voice mail system of claim 12, wherein a user sets a particular period of time Y for which each message is played.

19. A method for operating a voice mail system for access by a user, the method comprising:

receiving an indication that the user having a voice mailbox of the voice mail system is accessing the user's voice mailbox; and in response to the indication that the user is accessing the user's voice mailbox, causing a voice mail message saved in the voice mailbox to be automatically played to the user when the user accesses the user's voice mailbox without first requiring the user to make a menu selection to choose to hear snippets instead of the entire messages and without requiring any further input from the user, wherein the message is played for a preselected time period, Y, even if the time period Y ends before the voice mail message has been played in its entirety.

20. The method of claim 19, further comprising:

after the voice mail message has been played for the time period Y, performing a scan mode default action.

21. The method of claim 20, wherein the default scan mode action is an autosave action, an autodelete action, a status change action, a prevent status change action or a combination thereof.

22. The method of claim 20, wherein the default scan mode action is set by the user.

23. The method of claim 20, wherein the default scan mode action is globally set for all users of the voice mail system.

24. The method of claim 20, further comprising the step of if a user makes a selection while a portion of a voice mail message is being played, performing an action associated with the user's selection.

* * * * *